UNITED STATES PATENT OFFICE.

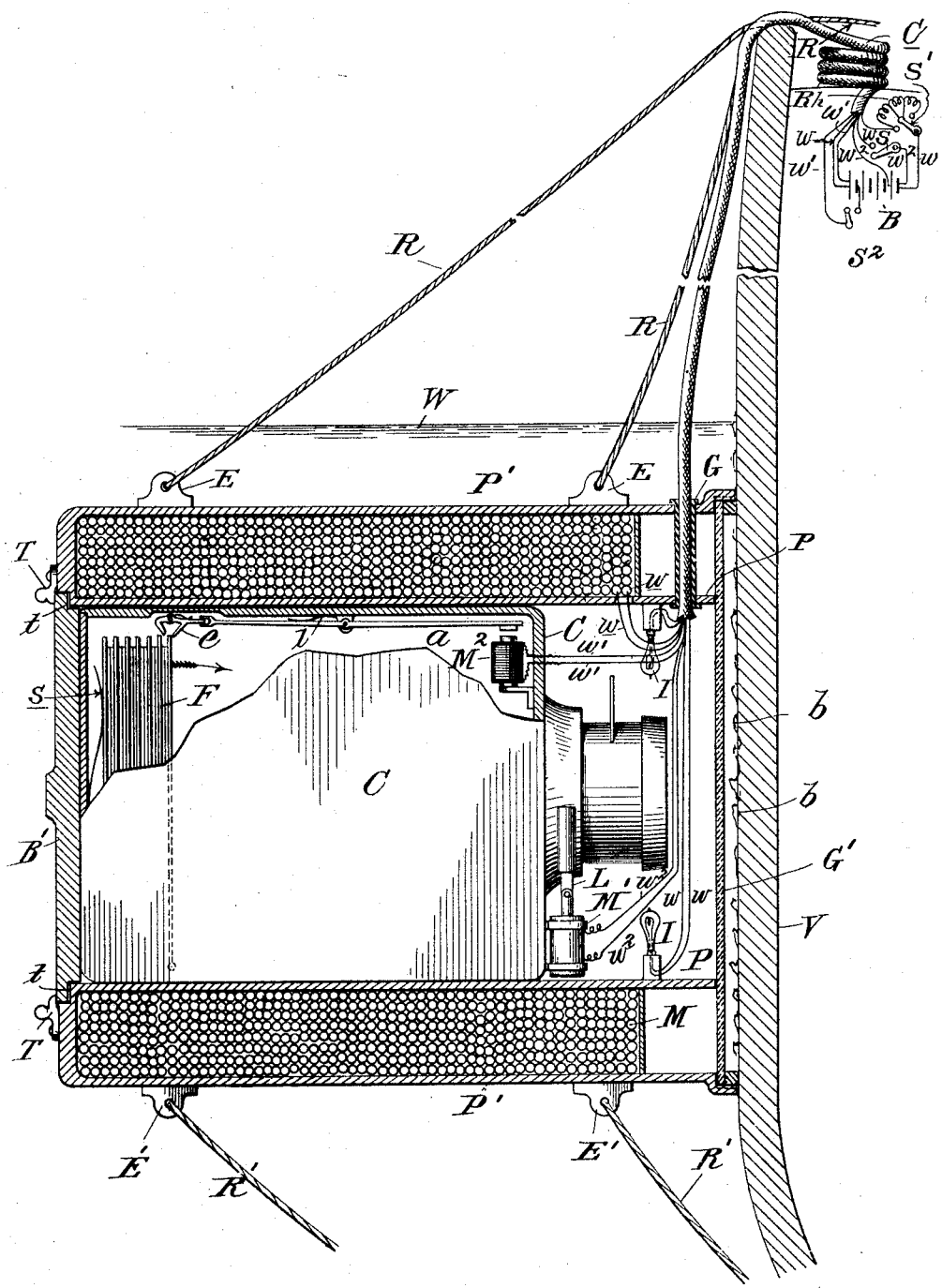

DAVID MASON, OF NEW YORK, N. Y.

SUBMARINE PHOTOGRAPHIC CAMERA.

SPECIFICATION forming part of Letters Patent No. 631,222, dated August 15, 1899.

Application filed November 11, 1898. Serial No. 696,142. (No model.)

*To all whom it may concern:*

Be it known that I, DAVID MASON, a citizen of the United States, residing at New York, in the county of New York and State of New York, have made a new and useful Invention in Apparatus for Photographing Objects Submerged in Water, of which the following is a specification.

My invention has for its objects, first, to provide means which will enable one to photograph various objects when submerged beneath water, and, second, to enable one to photograph accurately the surfaces of the sides and bottoms of submerged vessels, and will be fully understood by referring to the accompanying drawing, which is a longitudinal sectional view of an apparatus embodying my invention, illustrating its application to the photographing of a sectional area of the side of an iron or steel vessel, a part of the latter being shown in sectional view.

My invention contemplates the placing of an ordinary camera, properly adjusted for a definite focal distance, in a water-tight casing provided at one end with a transparent medium for admitting rays of light from the object to be photographed beneath the surface of the water and inclosing also electric or other illuminating lamps, together with electromagnetic means and circuit connections for controlling the movements of the mechanical parts of the camera.

Referring to the drawing in detail, V represents in sectional view one side of an iron or steel vessel floating in a body of water W.

C represents a camera fitting snugly within an iron or other magnetic water-tight casing composed of two integral parts P P', which constitute the magnetic poles for a coil M, wound in the space between said poles. The ends of the coil are connected by conductors $w\ w$, running through a cable $c$, extending upward through a water-tight gasket G to a point above the deck of the vessel, where they are joined to an electric generator or battery B, rheostat $R^h$, and switch $S'$.

E E and E' E' are pairs of lugs or ears integral with the outer part P' and adapted to act as supports and means for manipulating the apparatus through the agency of pairs of ropes R R R' R', carried to the deck of the vessel, one set being located above, as shown, and the other set below and passing under the bottom thereof.

G' represents a thick glass or other transparent face secured in a water-tight manner in the front part of the casing and in front of the camera C.

B' represents the rear portion of the camera, which is shouldered, as shown, and abuts against a water-tight gasket $t\ t$ in such manner as to make the entire structure water-tight, T T being clamps or catches for securing the bottom in position.

I I are incandescent lamps connected by conductors $w\ w\ w$, running through the cable, to the switch $S'$ and rheostat $R^h$.

M' represents an electromagnet secured to the camera and adapted to actuate an arm or link L, which in turn manipulates the operation of the shutter to the camera, said electromagnet being connected by conductors $w^2\ w^2$, running through the cable $c$, to a switch S and a section of the battery or generator B.

$M^2$ represents an electromagnet, and $a$ an armature-lever for manipulating an escapement $e$, which in turn controls the releasing of the films F after they have been exposed, the arrangement of the escapement being not unlike that usually found in releasing devices for films of cameras, $s$ being a spring for forcing the films forward and $l$ a spring for controlling the movements of the armature-lever $a$, all of said parts being located within the camera. The electromagnet $M^2$ is connected by conductors $w'\ w'$ through the cable $c$ with a switch $S^2$, operatively connected with a section of the battery B.

The operation of the apparatus is as follows: Through the agency of the two upper pairs of ropes R R R R it is lowered over the side of the vessel to the desired point, and the additional pairs of ropes R' R' are conveyed beneath the bottom and carried above deck upon the opposite side, the camera of course having first been properly focused and placed in position with the proper supply of films F for use and the bottom B' secured by the clamps or catches T T. Suppose, now, it is desired to take a correct photograph of the barnacles or other substances $b\ b$ which are attached to the side of a vessel, as indicated in the drawing, the attendant first closes the circuit of the entire battery B through the switch S' and rheostat R^h, cutting out the desired amount of resistance from said rheostat, thereby causing the pole-pieces P P' to be magnetized through the agency of the coil M and causing it to adhere closely to the side of the vessel. The closing of the same circuit through the switch S' closes also a multiple-arc branch through the conductors w w and incandescent lamps I I, preferably two or more in number, within the casing, thereby furnishing sufficient light to effectually illuminate the surface to be photographed. After the device is thus caused to adhere to the side of the vessel the attendant actuates the switch S, thereby closing a circuit through the conductors $w^2$ $w^2$ to the electromagnet M', thus causing the arm or link L to actuate the drop or shutter of the camera for the desired length of time, exposing the film F and effecting thereon a correct picture of the exposed part of the vessel. After the exposure has been extended for a sufficient length of time the switch S is opened and the switch $S^2$ is closed, thereby causing the electromagnet $M^2$ to release the film F just exposed and to present to view a new film, which may be exposed for a duplication of the picture, if desired, or the switch S' may be opened and the apparatus moved to any desired point for the procuring of further photographs.

Although I have made an especial illustration of my invention as applicable to the photographing of the sides and bottoms of vessels, I do not limit myself to this particular application, as it is obvious that it may be used under various conditions—as, for instance, photographing fishes, caissons, bridge-piers, and submarine structures generally; in fact, for the photographing of any bodies or surfaces beneath the surface of water, it being only necessary to lower the apparatus to the desired depth by the agency of the pairs of ropes R R.

Although I have herein shown and described electromagnetic means for holding the apparatus in close proximity to the surface of a vessel or other magnetic surface, I do not limit myself to such means, as it is obvious that the camera may be manipulated in this respect by means of the pairs of ropes R and R' or by other mechanical means. It is also obvious that the case of the camera itself might be water-tight and that the means of illumination and controlling devices for the mechanical parts of the camera might be secured to the front thereof or in any other desired position for manipulating the same through the agency of conductors running to a point above water so long as the operative parts of the camera itself are wholly protected from the water. Nor do I limit myself to the use of electromagnetic means for controlling the operation of the shutter, as I believe I am broadly entitled to claim a camera having all of its operative parts protected from the water and provided with means for operating the shutter thereof when submerged and also with means for furnishing artifical light to the objects to be photographed beneath water whether the same be electric or other sources of illumination, and my claims are generic as to these features.

Having thus described my invention, what I claim, and desire to secure by Letters Patent of the United States, is—

1. An apparatus for photographing bodies or surfaces beneath water, consisting of a camera having all of its operative parts protected from the water, in combination with means extending above the surface of the water for releasing the shutter of the camera when desired, substantially as described.

2. An apparatus for photographing bodies or surfaces beneath water, consisting of a camera having all of its operative parts protected from the water, in combination with means extending above the surface of the water for releasing the shutter of the camera when desired, and an illuminating device for furnishing light to the object to be photographed, substantially as described.

3. An apparatus for photographing bodies or surfaces beneath water, consisting of a camera having all of its operative parts protected from the water and provided with means for raising and lowering it to any desired depth; in combination with means extending from the camera to a point above the water for manipulating the shutter thereof, substantially as described.

4. An apparatus for photographing bodies or surfaces beneath water, consisting of a camera having all of its operative parts protected from the water and provided with means for raising and lowering it to any desired depth; in combination with means extending from the camera to a point above the water for manipulating the shutter thereof, together with an artificial source of illumination for furnishing light to the object to be photographed, substantially as described.

5. An apparatus for photographing bodies or surfaces beneath water, consisting of a camera having its parts protected from the water and provided with means for raising and lowering it to any desired depth; in combination with means extending from the camera to a point above the water for manipulating the shutter thereof; together with an artificial source of illumination for furnishing light to the object to be photographed and additional means extending to a point above the surface of the water for releasing the films as desired, substantially as described.

6. An apparatus for photographing bodies or surfaces beneath water, consisting of a camera having its parts protected from the water and provided with means for raising and lowering it to any desired depth; in combination with electromagnetic means for controlling the movements of the shutter thereof and circuit connections running therefrom to an electrical generator located above the water, substantially as described.

7. An apparatus for photographing bodies or surfaces beneath water, consisting of a camera having its parts protected from the water and provided with means for raising and lowering it to any desired depth; in combination with electromagnetic means for controlling the movements of the shutter thereof and circuit connections running therefrom to an electrical generator located above the water, together with a source of artificial illumination for furnishing light to the object to be photographed, substantially as described.

8. An apparatus for photographing bodies or surfaces beneath water, consisting of a camera having its parts protected from the water and provided with means for raising and lowering it to any desired depth; in combination with electromagnetic means for controlling the movements of the shutter thereof and circuit connections running therefrom to an electrical generator located above the water, together with a source of artificial illumination for furnishing light to the object to be photographed, and electromagnetic means for controlling the movements of the films, said electromagnetic means being also connected by conductors with a source of electrical energy, located above the surface of the water, substantially as described.

9. An apparatus for photographing bodies or surfaces beneath water, consisting of a camera having its parts protected from the water and provided with means for raising and lowering it to any desired depth; in combination with electromagnetic means for controlling the movements of the shutter thereof, one or more electric lamps for furnishing illumination to the object to be photographed and electromagnetic means for controlling the movements of the films, all of said electromagnetic means and electric lamps being connected by conductors through a cable running to a source of electrical energy above the surface of the water, substantially as described.

10. An apparatus for photographing bodies or surfaces beneath water, consisting of a camera having all of its operative parts protected from the water and provided with means for holding it against the side or bottom of a vessel or surface to be photographed; in combination with means for illuminating such surface and additional means for manipulating or controlling the movements of the camera-shutter, substantially as described.

11. An apparatus for photographing bodies or surfaces beneath water, consisting of a camera having its parts protected from the water and provided with electromagnetic means for holding it against the side or bottom of a vessel or surface to be photographed; in combination with an electrical source of illumination for illuminating such parts or surfaces, together with electromagnetic means for controlling the movements of the camera-shutter, substantially as described.

In testimony whereof I have hereunto subscribed my name this 9th day of November, 1898.

DAVID MASON.

Witnesses:
  C. J. KINTNER,
  M. F. KEATING.